United States Patent Office 2,716,125
Patented Aug. 23, 1955

2,716,125

3(β)-ACETOXY-16(δ-ACETOXYISOCAPROOXY)-ALLOPREGNANEDIONE-11,20

Ralph F. Hirschmann, Westfield, Norman L. Wendler, Summit, and William V. Ruyle, Westfield, N. J., assignors to Merck & Co., Inc., Rahway, N. J., a corporation of New Jersey No Drawing. Application October 14, 1953,
Serial No. 386,101

3 Claims. (Cl. 260—397.45)

This invention relates to novel compounds of the cyclopentanopolyhydrophenanthrene series and methods of preparing the same. More particularly, it relates to an improved process for the conversion of 20-ketopregnane compounds having a 16-acyloxy substituent to the corresponding $\Delta^{16}$-20-ketopregnene compounds, and to the application of this improved method for the preparation of the new compound, 3(β)hydroxy-$\Delta^{16}$-allopregnenedione-11,20-, and its acyl derivatives.

In one method of degrading the side chain of steroidal sapogenins, 20-ketopregnanes having a 16-acyloxy substituent are obtained. Thus, for example, sapogenins may be reacted with acetic anhydride at elevated temperatures to form the pseudo-sapogening compound, which is oxidized under mild conditions to the corresponding 20-ketopregnane having a 16-(δ-acetoxyisocaprooxy) substituent. This degradation process may be represented by partial formulas as follows:

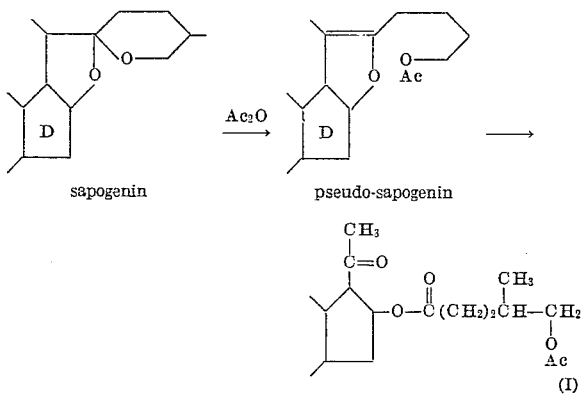

It is an object of the present invention to provide an improved process for hydrolyzing the oxidation products of pseudosapogenins, namely, the 20-ketopregnane compounds, represented by (I) above, having a 16-(δ-acyloxyisocaprooxy) substituent, to the corresponding $\Delta^{16}$-20-ketopregnene in enhanced yields. It is a further object to provide a process for preparing the novel compound, 3(β)-hydroxy-$\Delta^{16}$-allopregnenedione-11,20 and acyl derivatives thereof from the corresponding 3-hydroxy-11-ketosapogenin. Other objects will be apparent from the detailed description hereinafter provided.

In accordance with one embodiment of our invention, we have found that 16-(β-acyloxyisocaprooxy)-pregnane compounds are converted to the corresponding $\Delta^{16}$-pregnene compound in improved yields by reaction with an alkali metal hydroxide in the presence of non-reactive inert solvent. Previously such 16-(δ-acyloxyisocaprooxy)-pregnane compounds had been hydrolyzed by reaction with an alcoholic solution of an alkali such as methanolic or ethanolic potassium hydroxide. However, the yields of the desired $\Delta^{16}$-pregnene compound obtained by this process were low, since the alcoholic solvent caused etherification and the production of considerable amounts of the 16-alkoxy compound having the partial formula

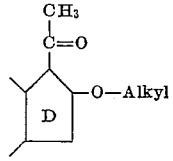

By carrying out this hydrolysis in accordance with our improved process, the formation of this undesirable side product is avoided and the $\Delta^{16}$-20-ketopregnene compounds are recovered in enhanced yields.

In carrying out our improved process the 16-(δ-acyloxyisocaprooxy) compound is heated with an aqueous solution of an alkali metal hydroxide and a suitable non-reactive inert organic solvent. In general, the solvents suitable for our process include those in which the 16-(δ-acyloxyisocaprooxy) compounds are soluble or partially soluble and which will not result in the formation of a 16-alkoxy compound. Solvents particularly suitable for this purpose that might be mentioned are tetrahydrofuran and dioxane.

Thus, in accordance with our invention sapogenin derivatives such as 3(β)-acetoxy-16-(δ-acetoxyisocaprooxy)-allopregnanedione-11,20 and 3(β)-acetoxy-16-(δ-acetoxyisocaprooxy)-allopregnanedione-12,20 are reacted by heating with an aqueous solution of an alkali metal hydroxide such as sodium hydroxide, and tetrahydrofuran to form the corresponding $\Delta^{16}$-20-ketopregnene compound in enhanced yields. After the reaction is completed, the desired product can be readily obtained by concentrating the reaction mixture under reduced pressure, extracting the product from the resulting residue with a suitable solvent such as ether, and recovering the product from the resulting dried extract.

The improved process of our invention is generally applicable to prepare the $\Delta^{16}$-20-ketopregnene compounds from the corresponding 16-acyloxy-20-ketopregnanes, and as pointed out above is particularly valuable in degrading oxidized sapogenin side chains. The starting compounds may contain various substituents such as hydroxy, keto or acyloxy substituents in the cyclopentanopolyhydrophenanthrene nucleus. When the starting material contains an acyloxy substituent, such as a 3-acetoxy group, these acyloxy substituents may also be partially hydrolyzed under the reaction conditions. Therefore, we find that it is sometimes desirable to acylate the crude hydrolysis product in order to convert any free hydroxy substituents to the corresponding acyl derivatives. Generally however the conditions are sufficiently mild that substantially no hydrolysis of a 3-acetoxy group will occur.

In accordance with a further embodiment of our invention we have found that the novel compound, 3(β)-acetoxy-$\Delta^{16}$-allopregnenedione-11,20 can be readily obtained in high yields from 11-ketotigogenin acetate by the process comprising reacting 11-ketotigogenin acetate at about 200° C. with an excess of acetic anhydride to form the corresponding pseudotigogenin derivative, oxidizing the pseudo-tigogenin derivative with chromium trioxide at about room temperature to form 3(β)-acetoxy - 16 - (δ-acetoxyisocaprooxy)-allopregnanedione-11,20, and reacting this product with aqueous sodium hydroxide and tetrahydrofuran. The 3(β)-acetoxy-$\Delta^{16}$-allopregnenedione-11,20 so obtained can be hydrolyzed to form the 3(β)-hydroxy compound which may be acylated in accordance with conventional practice to prepare other acyl derivatives of 3(β)-hydroxy-$\Delta^{16}$-allopregnenedione-11,20.

This product and its acyl derivative are useful as intermediate products for the preparation of other steroid compounds such as cortisone and the like. Similarly, the other Δ¹⁶-20-ketopregnene compounds prepared in accordance with our process are useful as intermediate products for the preparation of other steroidal compounds.

Thus, the novel products of this invention can be converted to cortisone in accordance with methods known in the art. For example, 3($\beta$)-hydroxy-Δ¹⁶-allopregnenedione-11,20 can be catalytically hydrogenated to form the corresponding saturated compound, 3($\beta$)-hydroxy-allopregnanedione-11,20. The latter compound can be converted to the corresponding 20-cyanohydrin which on dehydration yields the corresponding Δ¹⁷,⁽²⁰⁾-20-cyano derivative. On treating this product with osmium tetroxide and hydrolyzing the resulting osmate ester 3($\beta$), 17-dihydroxy allopregnanedione-11,20 is obtained. This compound can then be oxidized by treatment with chromium trioxide in the presence of acid to form the corresponding 3-keto compound. The 3,11,20-triketo-17($\alpha$)-hydroxy allopregnane so prepared is then converted to the corresponding 21-acetoxy derivative by reaction with lead tetraacetate in accordance with methods known in the art. The resulting 3,11,20-triketo 17($\alpha$)-hydroxy-21-acetoxy allopregnane is then converted to cortisone acetate utilizing procedures described in the art, comprising brominating the allopregnane compound to obtain the corresponding 2,4-dibromo derivative treating the dibromide with sodium iodide to form the Δ⁴-2-iodo-3-keto compound, and reacting the latter product with chromous chloride.

The following examples are presented as specified illustrative embodiments of our invention.

residue on acid washed alumina gave a non-crystalline fraction weighing 1.31 g. This was dissolved in 10 ml. of ethylene dichloride and to the stirred solution was added 0.70 g. of chromium trioxide dissolved in 15 ml. of 90% acetic acid. The mixture was stirred two hours at room temperature, one ml. of ethanol was added, and the mixture was concentrated in vacuo to a volume of ten milliliters. The mixture was diluted with 50 ml. of water, and extracted with ether. The ether layer was washed with water, and then with aqueous sodium bicarbonate. The ether solution was dried over sodium sulfate and the solvent removed by distillation.

The resulting residue, 3($\beta$)-acetoxy-16($\delta$-acetoxyisocaprooxy)-allopregnanedione-11,20 was refluxed for 30 minutes with a mixture of 15 ml. of 2.5 N sodium hydroxide solution and 15 ml. of tetrahydrofuran. The mixture was concentrated in vacuo to about one-half volume, and was extracted with ether. The dried ether solution was concentrated to dryness and the residue was crystallized from methanol. Yield, 0.40 g., M. P. 182.5–185° C. The product was heated on the steam bath in a mixture of 3 ml. pyridine and 0.5 ml. acetic anhydride. The product, isolated by conventional methods, was found to melt at 183–185° C. Recrystallized from methanol in rectangular prisms, M. P. 183.5–185° C. Absorption spectrum λ max. 2345 Å.;

$E_{1\ cm.}^{1\%}$ 243 (in ethanol)

$[\alpha]_D^{24}$ +64.5 (c=1.24 in CHCl₃). Anal. calcd. for $C_{23}H_{32}O_4$: C, 74.16; H, 8.66. Found: C, 73.93; H, 8.83.

EXAMPLE 1

*Conversion of 11-ketotigogenin acetate to 3($\beta$)-acetoxy-Δ¹⁶-allopregnenedione-11,20*

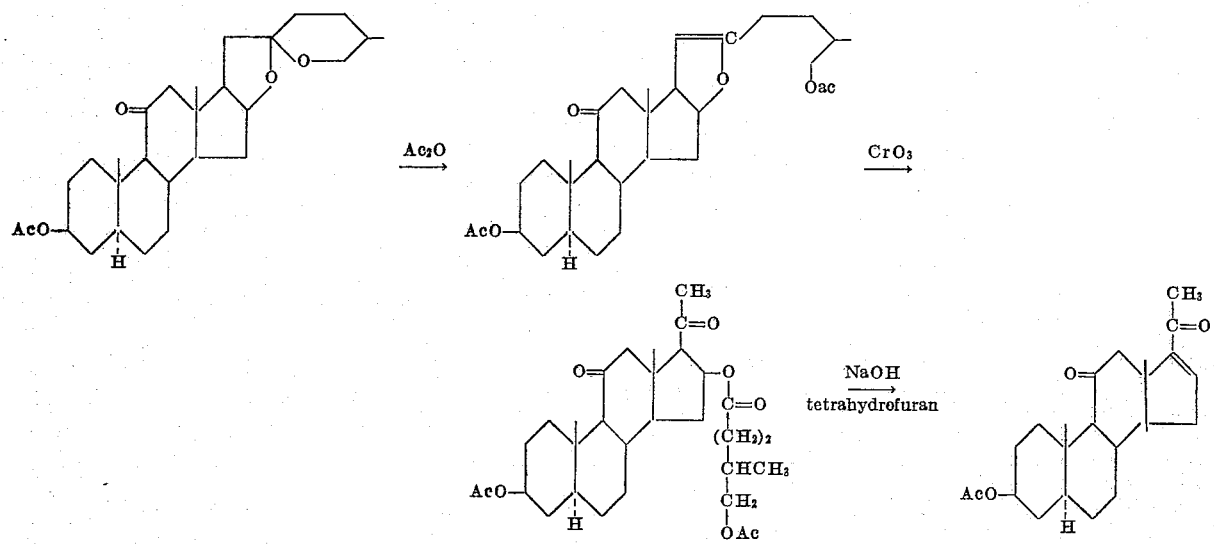

A mixture of 1.50 g. of 11-ketotigogenin acetate (prepared as described in copending application Serial No. 215,026, filed March 10, 1951) and five milliliters of acetic anhydride was heated in a sealed tube at 200° C. for ten hours. Removal of excess acetic anhydride in vacuo left an oily residue. Chromatography of this oily The 3($\beta$)-acetoxy-Δ¹⁶-allopregnenedione-11,20 was hydrolyzed to obtain 3($\beta$)-hydroxy-Δ¹⁶-allopregnanedione-11,20 having a melting point of 220–221.5° C.

In accordance with conventional methods, this latter compound can be acylated to obtain other 3-acyloxy derivatives.

EXAMPLE 2

*Conversion of pseudohecogenin diacetate to 3(β)-acetoxy-Δ16-allopregnenedione-12,20*

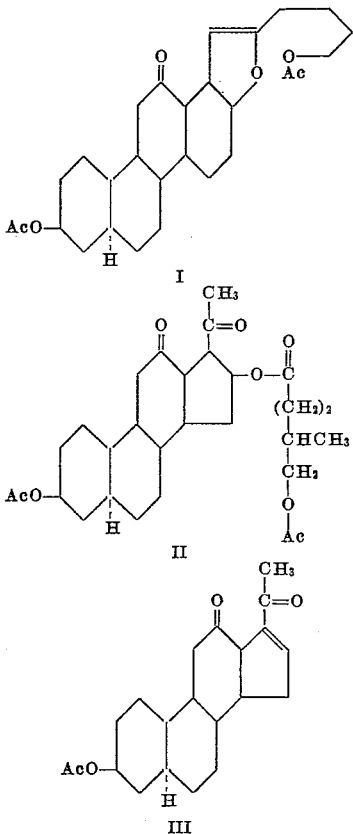

A solution of 4.5 g. of pseudohecogenin diacetate (I) was dissolved in a mixture of 175 cc. of glacial acetic acid, 30 cc. of water and six drops of methanol was ozonized at 0° C. The resulting reaction mixture was allowed to stand at room temperature, and then was concentrated to a small volume under diminished pressure. The ozonide was decomposed by treatment with zinc and acetic acid and the ozonized product (II) was recovered by concentrating the reaction mixture under diminished pressure, dissolving the residue in ether, filtering to remove the zinc salts, washing the ether to remove acidic substances, and evaporating the ether. The residue so obtained weighed 4.41 g.

The residue so obtained was dissolved in 40 cc. of tetrahydrofuran, 36 cc. of 2.5 N sodium hydroxide added thereto, and the resulting mixture was heated on a steam bath for 30 minutes in a nitrogen atmosphere. The reaction mixture was then concentrated under diminished pressure to obtain an oily residue which was dissolved in ether and washed free of base. The dried ethereal solution afforded 2.5 g. of a crystalline product which was reacetylated by reaction with acetic anhydride in the presence of pyridine to yield about 2.5 g. of crude 3(β)-acetoxy-Δ16-allopregnenedione-12,20, λ max. 227 (E% 139). (The pure compound shows an E% of about 202 at 227–228 mu.)

The crude product so obtained was dissolved in ether and sufficient Skelly Solve C (a petroleum hydrocarbon fraction) added to incipient precipitation. The resulting solution deposited 1.25 g. of a crystalline substance which was dissolved in 40 cc. of benzene. The benzene solution was chromatographed over 60 g. of acid washed alumina which was washed with more benzene, and finally eluted with a 1 to 1 chloroform-benzene mixture. The 3(β)-acetoxy-Δ16-allopregnenedione-12,20 was recovered from the resulting eluates in the form of crystals melting at 180–182° C.

The ether-Skelly Solve C mother liquors were concentrated under diminished pressure to obtain 1.14 g. of residue which was chromatographed over acid washed alumina by the method described above to yield additional amounts of the desired product. The total yield of 3(β)-acetoxy-Δ16-allopregnenedione-12,20 was about 50% of theory.

In a further experiment, 0.210 g. of the crude ozonide was hydrolyzed by the above described procedure and the 3(β)-acetoxy-Δ16-pregnenedione-12,20 (III) (0.52 g. melting at 172–179° C.) was isolated without recourse to reacetylation. The melting point of the product so obtained was not depressed on admixture with an authentic sample of the product melting at 181–183° C. This indicates that the reacetylation step is unnecessary and that the hydrolysis procedure does not result in the removal of the acetyl group.

This application is a continuation-in-part of our copending application, Serial No. 221,128, filed April 14, 1951, now abandoned.

We claim:

1. 3(β)-acetoxy - 16(δ - acetoxyisocaprooxy) - allopregnanedione-11,20.

2. The process of preparing (β)-acetoxy-16(δ-acetoxyisocaprooxy)-allopregnanedione-11,20 which comprises oxidizing pseudo-11-ketotigogenin acetate with chromium trioxide.

3. The process of preparing 3(β)-acetoxy-16-(δ-acetoxyisocaprooxy)-allopregnanedione-11,20 which comprises heating 11-ketotigogenin acetate with acetic anhydride at about 200° C., and reacting the resulting reaction product with chromium trioxide.

References Cited in the file of this patent

UNITED STATES PATENTS

| | | |
|---|---|---|
| 2,352,852 | Marker | July 4, 1944 |
| 2,380,483 | Wagner | July 31, 1945 |
| 2,408,830 | Wagner | Oct. 8, 1946 |
| 2,666,770 | Wall | Jan. 19, 1954 |

OTHER REFERENCES

Chamberlin, Jour. Am. Chem. Soc. 73, 2396–2397 (1951).